United States Patent Office 3,532,739
Patented Oct. 6, 1970

3,532,739
CAUSTIC SOLUBLE SULFOALKYLCARBAMATE ESTERS
Fred S. Eiseman, Jr., Maplewood, and Leslie M. Schenck, Mountainside, N.J., assignors to GAF Corporation, New York, N.Y., a corporation of Delaware
No Drawing. Filed Oct. 5, 1966, Ser. No. 585,714
Int. Cl. C07c 143/14
U.S. Cl. 260—481      6 Claims

ABSTRACT OF THE DISCLOSURE

A caustic soluble sulfoalkylcarbamate ester having excellent cotton wetting properties having the following formula:

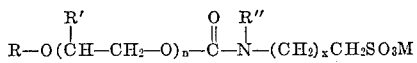

wherein R is an alkyl of from 1 to 7 carbon atoms, R' is a member selected from the group consisting of hydrogen and alkyl of from 1 to 3 carbon atoms, R" is a member selected from the group consisting of hydrogen and alkyl of from 1 to 4 carbon atoms, M is a member selected from the group consisting of hydrogen, sodium, potassium and lithium, $n$ is an integer of from 1 to 2, and $x$ is an integer of from 1 to 5.

---

This invention relates to a new series of sulfoalkylcarbamate esters of lower alkyl cellosolves, primary aliphatic alcohols and of alkylene oxide adducts of said alcohols, having excellent solubility in concentrated alkalis and excellent cotton wetting properties.

The caustic soluble sulfoalkylcarbamate esters provided by the present invention are a new series of anionic wetting agents which are very valuable as mercerizing surfactants for cotton. The hydrophobic function of the sulfoalkylcarbamate ester molecule is supplied by a primary alcohol of from 1 to 7 carbon atoms or by the alkylene oxide adduct of such alcohols, and the water solubilizing or hydrophilic function is furnished either by a 2-aminoalkyl sulfonic acid salt or by an N-alkylamino alkane sulfonic acid salt.

In providing the caustic soluble sulfoalkylcarbamate esters of the present invention, we react 1 mole of a lower alkyl cellosolve, primary aliphatic alcohol of from 1 to 7 carbon atoms or an alkylene oxide adduct of said alcohol containing from 1 to 2 alkyleneoxy units with a molar excess of phosgene (carbonyl chloride) at temperatures of about 10° C. to 70° C. for a period of time ranging from 2 to 2½ hours, during which a mole of phosgene reacts with the hydroxyl function to yield a chloro substituted formic acid ester of the cellosolve, aliphatic alcohol or alkyleneoxide adduct of said alcohol, which hereinafter for the sake of brevity will be referred to simply as chloroformate ester. The reaction with phosgene is preferably carried out at a temperature of from 20° C. to about 50° C. with external cooling. After the chloroformate ester reaction has been completed, about 1 mole thereof is added dropwise to an aqueous solution containing about 1 mole of 2-aminoalkane sulfonic acid salt or about 1 mole of an N-alkylamino alkane sulfonic acid salt. During the addition of the chloroformate ester, the reaction mixture is maintained at 20°–45° C. and at a pH of 10.5 to about 11 by the simultaneous addition of 0.6 to 1.2 moles of an alkali metal hydroxide such as sodium hydroxide, potassium hydroxide, lithium hydroxide, calcium hydroxide and the like in aqueous solution. The concentration of the alkali metal hydroxide may range from 20–30 percent by weight. The reaction mixture is then stirred for an additional time ranging from about 15 to about 45 minutes at a temperature of about 40°–50° C., preferably at around 45° C., and then cooled to room temperature. The resulting N-alkyl-N-sulfoalkylcarbamate ester of the lower alkyl cellosolve, primary aliphatic alcohol or alkylene oxide adduct of said alcohol, which may be employed as the slurry or as a dry powder, shows outstanding wetting characteristics in concentrated alkaline solutions in which it neither discolors nor degrades.

As examples of lower alkyl cellosolves that are reacted with carbonyl chloride, the following are illustrative: methyl cellosolve, ethyl cellosolve, n-propyl cellosolve, isopropyl cellosolve, n-butylcellosolve and isobutyl cellosolve.

As examples of primary aliphatic alcohols of from 1 to 7 carbon atoms that are reacted with carbonyl chloride, the following are illustrative: methanol, ethanol, n-propanol, isopropanol, butanol, n-butanol, isobutanol, pentanol, hexanol and heptanol. These alcohols may be used as such or as their alkyleneoxide adducts in which the alkyleneoxy units range from 1 to 2, such as, for example, ethylene oxide, propylene oxide, butylene oxide and pentylene oxide. Such alkyleneoxy adducts are prepared by conventional procedures well known to those skilled in the art.

As examples of 2-amino-alkane sulfonic acid salts that are employed in the form of their alkali metal salts and condensed with the chloroformate ester, the following are illustrative: taurine, N-methyl taurine, N-ethyl taurine, N-propyl taurine, N-isopropyl taurine, N-butyl taurine, N-isobutyl taurine, and N-tert.-butyl taurine.

As examples of N-alkylamino alkane sulfonic acids that are employed in the form of their alkali metal salts, the following are illustrative:

γ-(N-methylamino) propane sulfonic acid,
γ-(N-ethylamino) propane sulfonic acid,
γ-(N-propylamino) propane sulfonic acid,
γ-(N-butylamino) propane sulfonic acid,
δ-(N-methylamino) butane sulfonic acid,
δ-(N-ethylamino) butane sulfonic acid,
δ-(N-propylamino) butane sulfonic acid,
δ-(N-butylamino) butane sulfonic acid,
ε-(N-methylamino) pentane sulfonic acid,
ε-(N-ethylamino) pentane sulfonic acid,
ε-(N-propylamino) pentane sulfonic acid, and
ε-(N-butylamino) pentane sulfonic acid, including the corresponding (N-alkylamino)-hexane sulfonic acids.

The sulfoalkyl carbamate esters prepared by the foregoing procedure and while employing the foregoing reactants are characterized by the following formula:

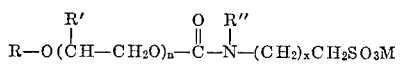

wherein R is an alkyl of from 1 to 7 carbon atoms, R' is either hydrogen or an alkyl of from 1 to 3 carbon atoms, R" is either hydrogen or an alkyl of from 1 to 4 carbon atoms, $n$ is an integer varying from 0 to 2, $x$ is an integer varying from 1 to 5, and M is either hydrogen or an alkali metal such as sodium, potassium or lithium.

The following examples will illustrate the manner in which the new sulfoalkylcarbamate esters of the present invention are obtained.

EXAMPLE I

A total of 218 grams (2.2 moles) of phosgene was reacted with 236 grams (2.0 moles) of butyl Cellosolve over a period of two hours. The temperature was maintained at 20° C. to 50° C. with external cooling. The resultant chloroformate ester was added dropwise with agitation over 1 hour to a solution of 984 grams (2.2 moles) of N-methyl taurine as a 31% aqueous solution of its sodium salt. The reaction was maintained at 25–45° C. and at a pH of 10.5 to 11.0 by the gradual addition of 240 grams of sodium hydroxide (1.80 moles) as its 30% aqueous solution. The reaction mixture was stirred an additional ½ hour at 45° C. The product, N-methyl-N-sulfoethyl carbamate of butyl Cellosolve, was soluble in aqueous sodium hydroxide solutions containing up to 25% by weight caustic. The following wetting times in various strength caustic at the 1% concentration level were determined by the AATCC STM 43–1952 method:

| Caustic strength, wt. percent: | Wetting time, seconds |
|---|---|
| 17 | 28 |
| 18 | 9.5 |
| 19 | 3.7 |
| 20 | 2.2 |
| 21 | 1.8 |
| 22 | 2.1 |
| 23 | 2.7 |
| 24 | 5.0 |
| 25 | 13.0 |

EXAMPLE II

A total of 198 grams (2.20 moles) of phosgene was reacted with 236 grams (2.0 moles) isobutyl Cellosolve over a period of two hours. The temperature was maintained at 20° C. to 50° C. with external cooling. The resultant chloroformate ester was added dropwise with agitation over 1 hour to a solution of 984 grams (2.2 moles) of N-methyl taurine as a 31% aqueous solution of its sodium salt. The reaction was maintained at 20–45° C. and at a pH of 10.5 to 11.0 by the gradual addition of 232 grams of sodium hydroxide (1.74 moles) as its 30% aqueous solution. The reaction mixture was stirred an additional ½ hour at 45° C. The product, N-methyl-N-sulfoethyl carbamate of isobutyl Cellosolve, was soluble in aqueous sodium hydroxide solutions containing up to 25% by weight caustic. The following wetting times in various strength caustic at the 1% concentration level were determined by the AATCC STM 43–1952 method:

| Caustic strength, wt. percent: | Wetting time, seconds |
|---|---|
| 15 | 58.0 |
| 16 | 10.0 |
| 17 | 2.7 |
| 18 | 1.5 |
| 19 | 1.3 |
| 20 | 1.3 |
| 21 | 1.5 |
| 22 | 2.0 |
| 23 | 2.9 |
| 24 | 5.5 |

EXAMPLE III

A total of 212 grams (2.14 moles) of phosgene was reacted with 264 grams (2.0 moles) of mono-ethoxylated primary amyl alcohol over a period of two hours. The temperature was maintained at 20° C. to 50° C. with external cooling. The resultant chloroformate ester was added dropwise with agitation over 1 hour to a solution of 984 grams (2.2 moles) of N-methyl taurine as a 31% aqueous solution of its sodium salt. The reaction was maintained at 20–45° C. and at a pH of 10.5 to 11.0 by the gradual addition of 240 grams of sodium hydroxide (1.8 moles) as its 30% aqueous solution. The reaction mixture was stirred an additional ½ hour at 45° C. The product, N-methyl-N-sulfoethyl carbamate of mono-ethoxylated primary amyl alcohol, was soluble in aqueous sodium hydroxide solutions containing up to about 25% by weight caustic. The following wetting times in various strength caustic at the 1% concentration level were determined by the AATCC STM 43–1952 method:

| Caustic strength, wt. percent: | Wetting time, seconds |
|---|---|
| 15 | 9.2 |
| 16 | 4.6 |
| 17 | 3.0 |
| 18 | 2.2 |
| 19 | 2.0 |
| 20 | 3.2 |
| 21 | 5.5 |
| 22 | 9.5 |
| 23 | 16.0 |

EXAMPLE IV

A total of 267 grams (2.7 moles) of phosgene was reacted with 220 grams (2.5 moles) primary amyl alcohol over a period of two hours. The temperature was maintained at 20° C. to 50° C. with external cooling. The resultant chloroformate ester was added dropwise with agitation over 1 hour to a solution of 1,230 grams (2.75 moles) of N-methyl taurine as a 31% aqueous solution of its sodium salt. The reaction was maintained at 20–45° C. and at a pH of 10.5 to 11.0 by the gradual addition of 275 grams of sodium hydroxide (2.06 moles) as its 30% aqueous solution. The reaction mixture was stirred an additional ½ hour at 45° C. The product, N-methyl-N-sulfoethyl carbamate of primary amyl alcohol, was soluble in aqueous sodium hydroxide solutions containing up to about 25% by weight caustic. The following wetting times in various strength caustic at the 1% concentration level were determined by the AATCC STM 43–1952 method:

| Caustic strength, wt. percent: | Wetting time, seconds |
|---|---|
| 15 | 11.0 |
| 16 | 6.0 |
| 17 | 3.7 |
| 18 | 2.5 |
| 19 | 2.0 |
| 20 | 2.1 |
| 21 | 2.5 |
| 22 | 5.0 |
| 23 | 13.0 |

EXAMPLE V

A total of 109 grams (1.1 moles) of phosgene was reacted with 204 grams (1.0 mole) of di-ethoxylated n-heptyl alcohol over a period of two hours. The temperature was maintained at 20° C. to 50° C. with external cooling. The resultant chloroformate ester was added dropwise with agitation over 1 hour to a solution of 442 grams (1.0 mole) of taurine as a 31% aqueous solution of its sodium salt. The reaction was maintained at 25–45° C. and at a pH of 10.5 to 11.0 by the gradual addition of 120 grams of sodium hydroxide (0.9 mole) as its 30% aqueous solution. The reaction mixture was stirred an additional ½ hour at 45° C. The product, N-sulfoethyl carbamate of di-ethoxylated n-heptyl alcohol, was soluble in aqueous sodium hydroxide solutions containing up to about 20% by weight caustic. The following wetting times in various strength caustic at the 1% concentration level were determined by the AATCC STM 43–1952 method:

| Caustic strength, wt. percent: | Wetting time, seconds |
|---|---|
| 18 | 60.0 |
| 19 | 30.0 |
| 20 | 55.0 |

EXAMPLE VI

A total of 218 grams (2.2 moles) of phosgene was reacted with 292 grams (2.0 moles) of mono-butoxylated butyl alcohol over a period of two hours. The temperature was maintained at 20° C. to 50° C. with external cooling. The resultant chloroformate ester was added dropwise with agitation over 1 hour to a solution of 984 grams (2.2 moles) of N-methyl taurine as a 31% aqueous solution of its sodium salt. The reaction was maintained at 20–45° C. and at a pH of 10.5 to 11.0 by the gradual addition of 250 grams of sodium hydroxide (1.88 moles) as its 30% aqueous solution. The reaction mixture was stirred an additional ½ hour at 45° C. The product, N-methyl-N-sulfoethyl carbamate of mono-butoxylated butyl alcohol was soluble in aqueous sodium hydroxide solutions containing up to about 25% by weight caustic. The following wetting times in various strength caustic at the 1% concentration level were determined by the AATCC STM 43–1952 method:

| Caustic strength, wt. percent: | Wetting time, seconds |
|---|---|
| 16 | 30.0 |
| 17 | 12.5 |
| 18 | 7.0 |
| 19 | 7.0 |
| 20 | 9.5 |
| 21 | 18.0 |
| 22 | 50.0 |

EXAMPLE VII

A total of 218 grams (2.2 moles) of phosgene was reacted with 208 grams (2.0 mole) of n-propyl cellosolve over a period of two hours. The temperature was maintained at 20° C. to 50° C. with external cooling. The resultant chloroformate ester was added dropwise with agitation over 1 hour to a solution of 1,280 grams (2.2 moles) of N-butyl taurine as a 31% aqueous solution of its sodium salt. The reaction was maintained at 20–45° C. and at a pH of 10.5 to 11.0 by the gradual addition of 245 grams of sodium hydroxide (1.80 moles) as its 30% aqueous solution. The reaction mixture was stirred an additional ½ hour at 45° C. The product, N-butyl-N-sulfoethyl carbamate of n-propyl Cellosolve, was soluble in aqueous sodium hydroxide solutions containing up to about 25% by weight caustic. The following wetting times in various strength caustic at the 1% concentration level were determined by the AATCC STM 43–1952 method:

| Caustic strength, wt. percent: | Wetting time, seconds |
|---|---|
| 18 | 38.0 |
| 19 | 10.0 |
| 20 | 5.5 |
| 21 | 4.2 |
| 22 | 5.0 |
| 23 | 9.5 |
| 24 | 24.0 |

The outstanding physical characteristics of the sulfoalkylcarbamate esters provided by the present invention are not only their solubility in aqueous solutions containing up to about 25% by weight of alkaline material, but also their stability in such solutions in which they do not discolor or degrade even upon prolonged standing.

We claim:
1. Compounds of the formula:

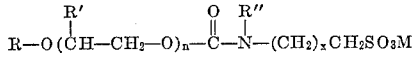

wherein R is an alkyl of from 1 to 7 carbon atoms, R' is a member selected from the group consisting of hydrogen and alkyl of from 1 to 3 carbon atoms, R" is a member selected from the group consisting of hydrogen and alkyl of from 1 to 4 carbon atoms, M is a member selected from the group consisting of hydrogen, sodium, potassium and lithium, $n$ is an integer of from 1 to 2, and $x$ is an integer of from 1 to 5.

2. The compound of the formula:

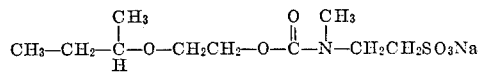

3. The compound of the formula:

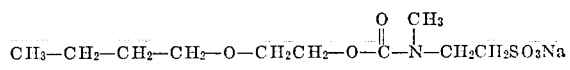

4. The compound of the formula:

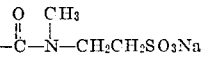

5. The compound of the formula:

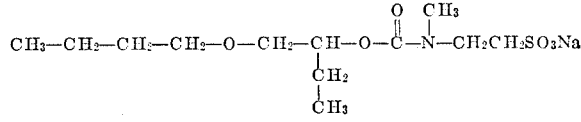

6. The compound of the formula:

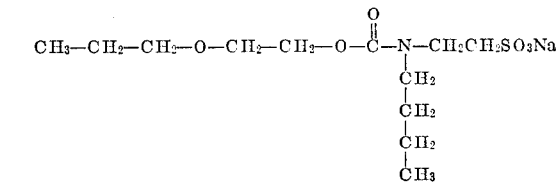

References Cited

UNITED STATES PATENTS

| 2,086,986 | 4/1963 | Orthner et al. | 260—481 |
| 2,221,914 | 11/1940 | Engel et al. | 260—470 |

FOREIGN PATENTS 854,796  7/1949  Germany.

JAMES A. PATTEN, Primary Examiner

E. J. GLEIMAN, Assistant Examiner

U.S. Cl. X.R.

8—127; 252—354